DECODER AND CODER CIRCUIT
Filed Oct. 10, 1961
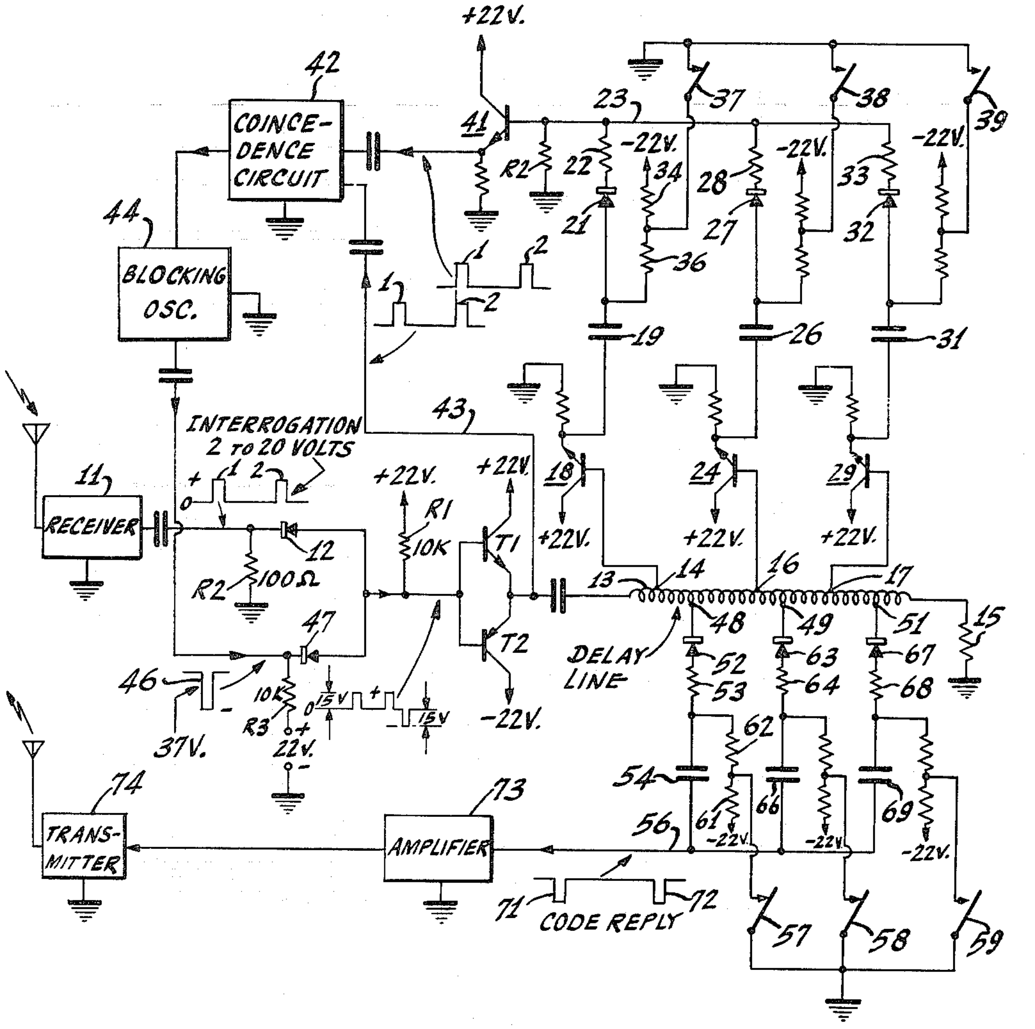
INVENTORS
DONALD P. CLOCK AND
GUELINO A. LUCCHI
BY Floyd M. Harris
ATTORNEY 3,092,830
Patented June 4, 1963

3,092,830

DECODER AND CODER CIRCUIT

Donald P. Clock, Granada Hills, and Guelino A. Lucchi, San Fernando, Calif., assignors to Radio Corporation of America, a corporation of Delaware Filed Oct. 10, 1961, Ser. No. 144,120
10 Claims. (Cl. 343—6.8)

This invention relates to improved apparatus which employs a delay line for two different functions, and particularly to improved transponder apparatus which employs a single delay line for both decoding and coding.

In transponder design it has been the practice to provide two separate delay lines, one for the decoding function and another for the coding function. Each delay line adds to the cost, weight and space required.

In practicing the present invention, as applied to transponders, or similar apparatus employing decoding and coding, a single delay line is utilized for both the decoding function and the coding function. In the example described hereinafter, the transponder is interrogated by pulses having a certain time spacing. The transponder has been set to decode this particular interrogation and to reply to it. The decoding is done by applying the interrogation pulses of a certain polarity to a delay line. They are taken off a selected spaced tap point on the delay line and passed through a uni-directionally conducting circuit that passes only pulses of said certain polarity. The delayed interrogation pulses and undelayed interrogation pulses are applied to a coincidence or "and" circuit which supplies an output pulse if the interrogation pulses have the correct spacing or interrogation mode.

The output pulse initiates a code reply trigger pulse which is applied to the same delay line but with a polarity opposite to said certain polarity of the interrogation pulses. This trigger pulse is taken off selected spaced tap points on the delay line and passed through uni-directionally conducting circuits. These circuits pass only pulses of said opposite polarity and supply them to a common output circuit as spaced code reply pulses.

The invention will be described in detail with reference to the accompanying drawing in which the single figure is a block and circuit diagram of a transponder embodying the invention.

The transponder comprises a receiver 11 at the output of which the interrogation pulses, such as spaced pulses 1 and 2, appear in response to interrogation. These pulses are applied, with positive polarity in the example illustrated, through a diode 12 and through line driver amplifiers comprising transistors T1 and T2 to a delay line 13 which has a non-reflecting termination provided by resistor 15. The diode 12 is forward biased through R1 and R2 by plus 22 volts, for example, applied to its anode, so that only interrogation pulses of less than 22 volts in amplitude will be passed with their amplitude information preserved. The resistance values of R1 and R2 may be, for example, 10,000 ohms and 100 ohms, respectively.

The delay line is tapped at points 14, 16, 17 corresponding to the interrogation modes (pulse spacings) to which the transponder may be set to reply, the mode replied to depending on the interrogation mode to which the transponder is switched as will be apparent from the following description. Delayed pulses at the tap 14 are applied to the base of an emitter follower transistor 18 that is provided to reduce delay line loading, and still preserve pulse signal amplitude without limiting. The positive polarity output pulses from transistor 18 are fed through a coupling capacitor 19, a diode 21 and a resistor 22 to a bus line 23. Resistors 22 and R2 form a voltage divider. It will be noted that diode 21 is connected to pass the positive polarity pulses, and will not pass negative polarity pulses.

The circuits feeding positive pulses from the taps 16 and 17 to the bus line 23 are the same as the one feeding from the tap 14. The circuit between tap 16 and bus line 23 includes a transistor 24, coupling capacitor 26, diode 27 and resistor 28. The circuit between tap 17 and bus line 23 includes a transistor 29, a coupling capacitor 31, a diode 32 and a resistor 33. Resistors 22, 28 and 33 preferably have resistance values that are selected to compensate for the attenuation of the delay line so that all the pulses appearing at the base of a transistor 41 (referred to later) will be equal in amplitude for any one pulse transmitted down the delay line. Thus, there is avoided the problem of different pulse amplitudes at different delay line taps in apparatus where the amplitude of the pulses is used for selection or comparison.

The diodes 21, 27 and 32 are back biased so that they cannot pass interrogation pulses unless a mode selection switch is closed to remove the back bias. Referring to diode 21, it is back biased by 22 volts, for example, of negative polarity applied through resistors 34 and 36. The junction point of resistors 34 and 36 may be connected to ground through a mode selection switch 37 to remove the back bias from diode 21. Similarly, the back bias may be removed from diode 27 by closing mode selection switch 38 and from diode 32 by closing mode selection switch 39.

Assuming that mode selection switch 37 is closed as illustrated, the delayed positive interrogation pulses will pass through diode 21 and through an emitter follower transistor 41 to a coincidence circuit 42. The interrogation pulses are passed without delay through a conductor 43 to the coincidence circuit 42. If the interrogation pulses 1 and 2 are of the selected mode spacing, delayed pulse 1 will be coincident with undelayed pulse 2, and the coincidence circuit 42 will supply an output pulse to a suitable circuit such as a blocking oscillator 44 for generating a trigger reply pulse 46 of negative polarity. The pulse 46 has an amplitude of about 37 volts in the present example so that after passing through a diode 47 it can pass through diodes 52, 63, 67 (described later) only after their back bias is removed. Diode 47 is back biased through resistor R3 by plus 22 volts so that it is held non-conducting. It should be noted that the normal quiescent potential on the anode of diode 47 is close to zero volts, i.e., close to ground potential. This is because of the low resistance of R2 as compared with that of R1. The 22 volts applied to R1 causes a voltage drop across diode 12 and R2 of only a few tenths of a volt. The negative pulse 46 must have an amplitude exceeding plus 22 volts in order to drive the cathode of diode 47 negative so that the diode will conduct. In the example given, it is driven 15 volts negative.

The negative trigger reply pulse 46 passed by diode 47 is applied to the delay line 13 through the line driver amplifiers comprising transistors T1 and T2. The delay line is tapped at a plurality of points such as points 48, 49 and 51, the point 48 corresponding to the time the code reply is to start after decoding of an interrogation, and one of the points 49 and 51, depending on which one is selected, corresponding to the desired code spacing between code reply pulses in the present example where the code reply is two spaced pulses.

The negative trigger reply pulse at tap 48 is fed through a diode 52, a resistor 53 and a coupling capacitor 54 to a bus line 56, assuming that switch 57 of the code selection switches 57, 58 and 59 is closed to remove back bias from diode 52. It will be noted that a back bias voltage of minus 22 volts, for example, is applied to the anode of diode 52 through resistors 61 and 62. The back bias may be removed by connecting the junction point of resistors 61 and 62 to ground through the switch 57.

The delayed trigger reply pulse 46 at tap 49 is fed through diode 63, resistor 64 and coupling capacitor 66 to the bus line 56 if the code reply selector switch 58 is closed. The delayed pulse 46 at tap 51 is fed through diode 67, resistor 68 and coupling capacitor 69 to the bus line 56 if the code reply selector switch 59 is closed. It will be seen that the diodes 63 and 67 are back biased in the same way as the diode 52 when their associated code reply selector switches are open. From the foregoing it is apparent that only a negative pulse, such as pulse 46, can pass through one or more of the diodes 52, 63 and 67 to the bus line 56. The positive polarity interrogation pulses 1 and 2 cannot pass through to the bus line 56. Likewise, the negative polarity trigger reply pulse 46 cannot pass through to the bus line 23.

The code reply to be transmitted in response to an interrogation is determined by which of the code reply selection switches 57, 58 and 59 are closed. In the example illustrated, the switches 57 and 58 are closed so that the time spacing between the code reply pulses 71 and 72 is the amount of delay produced by the delay line between taps 48 and 49. The code reply is amplified by an amplifier 73 and transmitted by a transmitter 74. The reply pulses 71 and 72 may be transmitted without reshaping, or they may be narrowed in the amplifier 73, or, if preferred, they may be used to gate through other pulses that are narrower and more accurately spaced than pulses 71 and 72.

What is claimed is:

1. In combination, a delay line comprising cascaded delaying elements, means for applying signal of a certain polarity to said delay line so that it travels through said delaying elements, a uni-directionally conducting circuit connected to a tap point on said delay line for conducting only signals of said certain polarity whereby said applied signal appears at the output of said circuit with a certain amount of delay, means for also applying to said delay line signals having a polarity the opposite of said certain polarity so that it travels through said same delaying elements, a second uni-directionally conducting circuit connected to a tap point on said delay line for conducting only signals of a polarity opposite to said certain polarity whereby said applied opposite polarity signal appears at the output of said second circuit with a certain amount of delay.

2. In combination, a delay line having a non-reflecting termination, means for applying positive polarity pulses to said delay line so that they travel along the delay line, a uni-directionally conducting circuit connected to a tap point on said delay line and connected out of the path of travel of said pulses along the delay line for conducting only said positive polarity pulses whereby said applied pulses appear at the output of said circuit with a certain amount of delay, means for also applying to said delay line negative polarity pulses so that they travel along the delay line, a second uni-directionally conducting circuit connected to a tap point on said delay line and connected out of the path of travel of said positive and negative polarity pulses along the delay line for conducting only said negative polarity pulses whereby said applied negative polarity pulses appear at the output of said second circuit with a certain amount of delay.

3. In combination, a delay line, means for applying groups of spaced pulses of a certain polarity to said delay line so that they travel along the delay line, a plurality of uni-directionally conducting circuits connected to different tap points on said delay line and connected out of the path of travel of the pulses along the delay line for conducting only pulses of said certain polarity whereby said applied pulses appear at the output of a selected one of said circuits with a certain amount of delay, switching means for conditioning a selected one of said uni-directionally conducting circuits for passing said groups of spaced pulses, means for also applying to said delay line pulses having a polarity the opposite of said certain polarity so that they travel along the delay line, a second plurality of uni-directionally conducting circuits connected to different tap points on said delay line and connected out of the path of travel of pulses along the delay line for conducting only pulses of a polarity opposite to said certain polarity whereby said applied opposite polarity pulses appear at the outputs of selected ones of said second circuits with a certain amount of delay, and switching means for conditioning selected ones of said second circuits for passing said opposite polarity pulses.

4. In a transponder responsive to interrogation pulses, means for decoding said interrogation pulses and for producing a reply code in response to said interrogation, said means for decoding and for producing said reply code comprising a delay line, means for applying said interrogation pulses to said delay line, a circuit connected to a tap point on said delay line whereby said interrogation pulses appear at the output of said circuit with a certain amount of delay, a coincidence circuit, means for applying to said coincidence circuit said delayed interrogation pulses and undelayed interrogation pulses whereby there is an output pulse from said coincidence circuit if the spacing between interrogation pulses is the same as said certain amount of delay, means for supplying in response to the occurrence of said output pulse a reply initiating pulse, and means for deriving from said reply initiating pulse and said delay line a reply code comprising at least two time spaced pulses.

5. Radio apparatus including means for receiving interrogation pulses, means for decoding said interrogation pulses and for producing a reply code in response to said interrogation, said means for decoding and for producing said reply code comprising a delay line, means for applying said interrogation pulses with a certain polarity to said delay line, a uni-directionally conducting circuit connected to a tap point on said delay line for conducting only pulses of said certain polarity whereby said interrogation pulses appear at the output of said circuit with a certain amount of delay, a coincidence circuit, means for applying to said coincidence circuit said delayed interrogation pulses and undelayed interrogation pulses whereby there is an output pulse from said coincidence circuit if the spacing between interrogation pulses is the same as said certain amount of delay, means for also applying to said delay line in response to the occurrence of said output pulse a pulse having a polarity the opposite of said certain polarity, a uni-directionally conducting circuit connected to a tap point on said delay line for conducting only pulses of a polarity opposite to said certain polarity whereby said applied opposite polarity pulses appear at the output of said second circuit with a certain amount of delay to form the reply code, and means for transmitting said reply code.

6. Radio apparatus including means for receiving an interrogation signal, means for decoding said interrogation signal and for producing a reply code in response to said interrogation, said means for decoding and for producing said reply code comprising a delay line, means for applying said interrogation signal with a certain polarity to said delay line, a plurality of unidirectionally conducting circuits connected to different tap points on said delay line for conducting only signals of said certain polarity whereby said interrogation signal appears at the output of a selected one of circuits with a certain amount of delay, mode switching means for conditioning a selected one of said uni-directionally conducting circuits for passing said interrogation signal, a coincidence circuit, means for applying to said coincidence circuit said delayed interrogation signal and undelayed interrogation signal whereby there is an output pulse from said coincidence circuit if the interrogation signal has the mode corresponding to the setting of said mode switching means, means for also applying to said delay line in response to the occurrence of said output pulse a pulse having a polarity the opposite of said certain polarity, a plurality of uni-directionally conducting circuits each connected to a different tap point on said delay line for conducting only pulses of a polarity opposite to said certain polarity whereby said applied opposite polarity pulses appear at the outputs of selected ones of said second circuits with a certain amount of delay, switching means for conditioning selected ones of said second circuits for passing said opposite polarity pulses, means for combining the outputs of said selected second circuits to form the reply code, and means for transmitting said reply code.

7. In radio apparatus which may receive interrogation pulses, means for decoding said interrogation pulses and for producing a reply code in response to said interrogation, said means for decoding and for producing said reply code comprising a delay line, means for applying said interrogation pulses with a certain polarity to said delay line, a uni-directionally conducting circuit connected to a tap point on said delay line for conducting only pulses of said certain polarity whereby said interrogation pulses appear at the output of said circuit with a certain amount of delay, circuit means to which said delayed interrogation pulses are applied for producing an output pulse if the spacing between interrogation pulses is the same as said certain amount of delay, means for also applying to said delay line in response to the occurrence of said output pulse a pulse having a polarity the opposite of said certain polarity, a plurality of uni-directionally conducting circuits each connected to a different tap point on said delay line for conducting only pulses of a polarity opposite to said certain polarity whereby said applied opposite polarity pulses appear at the outputs of said second circuits with a certain amount of delay depending on the tap location, and means for combining the outputs of said second circuits to form the reply code.

8. In radio apparatus which may receive interrogation pulses, means for decoding said interrogation pulses and for producing a reply code in response to said interrogation, said means for decoding and for producing said reply code comprising a delay line, means for applying said interrogation pulses with a certain polarity to said delay line, a uni-directionally conducting circuit connected to a tap point on said delay line for conducting only pulses of said certain polarity whereby said interrogation pulses appear at the output of said circuit with a certain amount of delay, circuit means to which said delayed interrogation pulses are applied for producing an output pulse if the spacing between interrogation pulses is a certain predetermined amount, means for also applying to said delay line in response to the occurrence of said output pulse a pulse having a polarity the opposite of said certain polarity, a uni-directionally conducting circuit connected to a tap point on said delay line for conducting only pulses of a polarity opposite to said certain polarity whereby said applied opposite polarity pulses appear at the output of said second circuit with a certain amount of delay to form the reply code.

9. In combination, a delay line, means for applying signal of a certain polarity to said delay line so that it travels along said delay line in a certain direction, a uni-directionally conducting circuit connected to a tap point on said delay line for conducting only signal of said certain polarity whereby said applied signal appears at the output of said circuit with a certain amount of delay, means for also applying to said delay line signal having a polarity the opposite of said certain polarity so that said opposite polarity signal also travels along said delay line in said certain direction, a second uni-directionally conducting circuit connected to a tap point on said delay line for conducting only signal of a polarity opposite to said certain polarity whereby said applied opposite polarity signal appears at the output of said second circuit with a certain amount of delay.

10. In a transponder responsive to interrogation pulses, means for decoding said interrogation pulses and for producing a reply code in response to said interrogation, said means for decoding and for producing said reply code comprising a delay line, a coincidence circuit, means for applying interrogation pulses to said delay line and to said coincidence circuit, an output circuit connected to a tap point on said delay line so that interrogation pulses appear at the output of said output circuit delayed a certain amount with respect to said pulses applied to said coincidence circuit, means for also applying to said coincidence circuit said interrogation pulses delayed said certain amount whereby there is an output pulse from said coincidence circuit if the spacing between interrogation pulses is the same as said certain amount of delay, means for supplying in response to the occurrence of said output pulse a reply initiating pulse, and means for deriving from said reply initiating pulse and said delay line a reply code comprising at least two time spaced pulses.

References Cited in the file of this patent

UNITED STATES PATENTS

| | | |
|---|---|---|
| 2,589,254 | Hoeppner | Mar. 18, 1952 |
| 3,001,137 | Kassel et al. | Sept. 19, 1961 |